F. W. STICKLE.
MANUFACTURE OF VANADIUM CAST IRON.
APPLICATION FILED JAN. 18, 1912.
1,046,232.
Patented Dec. 3, 1912.
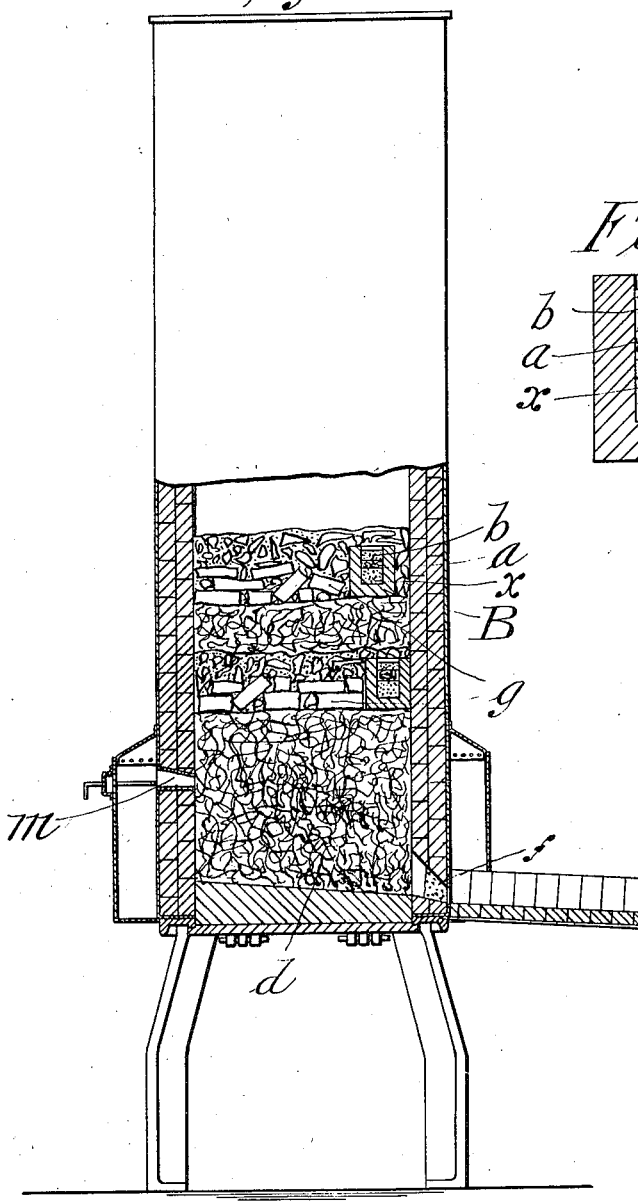
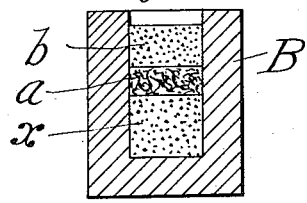

UNITED STATES PATENT OFFICE.

FREDERICK W. STICKLE, OF NEWINGTON, CONNECTICUT.

MANUFACTURE OF VANADIUM CAST-IRON.

1,046,232.     Specification of Letters Patent.     Patented Dec. 3, 1912.

Application filed January 18, 1912. Serial No. 671,918.

*To all whom it may concern:*

Be it known that I, FREDERICK W. STICKLE, a citizen of the United States of America, and resident of Newington, in the county of Hartford and State of Connecticut, have invented certain new and useful Improvements in the Manufacture of Vanadium Cast-Iron, of which the following is a full, clear, and exact description.

This invention relates to the manufacture of metal having homogeneously combined therein any desired proportion of vanadium.

The invention particularly pertains to the manufacture of "vanadium cast iron".

As known, it is highly advantageous and desirable in the production of iron for casting that a small percentage of vanadium, governed by the result or quality required be combined in the iron for the purpose of improving the quality and texture thereof; and it has been proposed to introduce vanadium for combination with or incorporation into the iron by fusion during process of melting the iron in a cupola or other furnace; but an uncertain or inconsequential proportion only of the vanadium has been really homogeneously combined with and permanently retained in the iron owing to oxidation whereby the comparatively rare and costly alloying metal is either consumed or dissipated in fumes or as a gas, or because of the inability to secure a fusion of the vanadium.

In the carrying out of my invention the vanadium, in quantity properly proportionate to the amount of iron with which it is to be combined, is so inclosed and excluded from the access of air thereto that when placed in a furnace,—in which the iron is placed preparatory to being melted,—and at a location in the furnace so remote from any twyers or air ingress openings that when the melting of the iron is proceeded with the inclosure for the vanadium remains intact until more or less of the lower portion of the iron in charge becomes molten, whereupon the receptacle of vanadium also becomes molten and entirely inclosed by, or submerged in the iron for which it has an affinity and with which it will become intimately and thoroughly commingled.

In the drawings:—Figure 1 is a sectional view of a cupola furnace showing the same charged as in readiness for the production of vanadium iron in accordance with this invention. Fig. 2 is a sectional view of the vanadium-containing closed receptacle or "capsule".

Preparatory to charging the cupola furnace A for a "heat", the proper quantity of vanadium $x$ is placed in a metallic receptacle B having substantially the fusibility of the metal to be melted in the furnace, such receptacle being composed of cast iron. Such receptacle B may, as shown, be in the form of an upwardly open cup or box and the chamber therein which is partly filled by the vanadium $x$ is closed against ingress of any air thereinto, but yet in such manner as to permit fumes or gases which may become generated to escape without explosion. This closure as here represented, is made by a comparatively thick layer $a$ of comminuted coke while the mouth portion of the receptacle is closed by a body $b$ of damp sand rammed hard into place.

The receptacle B is placed above the fuel bed employed in the melting furnace and at a location remote from any of the twyers or air ingress openings into the cupola; and the location of the vanadium-containing receptacle in proximity over the tap hole $f$ is entirely advantageous for satisfactory results. The iron $g$ to be melted is laid up in the stack and the heat proceeded with in the usual way. About concurrently with the melting of some considerable portion of the body of the iron in the charge referred to the container for the vanadium becomes fused, at or shortly following the completion of which fusing the vanadium itself will be so completely melted and enveloped in an ample body of the melted iron as to be prevented from dissipation by oxidation or passing off as a gas or fumes; but it, such molten vanadium, permeates and becomes a homogeneous part of all of the iron which becomes finally melted in the charge.

After proper time and as customary in ordinary iron melting for casting, the liquid iron with vanadium incorporated therein is drawn off into a large ladle, the size of which is sufficient to receive the entire melted contents of the charge, whereupon the vanadium becomes even more thoroughly and effectually mixed into the iron so that when the melted metal is poured, by use of small ladles, into the molds, the castings have the quality sought to be attained.

As the invention has been carried out, I have been able to obtain vanadium iron castings of the quality wanted by the employment of vanadium as small as, or even less than three and one-half pounds to the thousand pounds of iron; but, of course, to persons familiar with the employment of this metal the proportion may be varied to correspond with different qualities required in the alloyed metal or composition being worked.

I claim:—

1. The process of combining vanadium with iron which consists in placing a quantity of vanadium in a receptacle, the fusing point of which is substantially the same as the iron with which the vanadium is to be combined, and closing said receptacle against the admission of air, then embedding the receptacle in the iron to be molten in a melting furnace at a location remote from any air ingress opening, then subjecting the iron and the receptacle embedded therein to a melting heat whereby upon the fusion of the iron and the said receptacle, the vanadium becomes enveloped in the molten body of the iron, and fused, without oxidation, and commingled with such molten body.

2. The process of incorporating vanadium in iron preparatory to casting which consists in placing a quantity of vanadium in a receptacle, the fusing point of which is substantially the same as the iron with which the vanadium is to be combined, placing a quantity of comminuted coke above the vanadium and sealing the mouth of the receptacle with a packed filling of sand, placing such receptacle in the lower part of a cupola furnace above the closed tap hole therefor, placing the iron to be molten in the cupola above the vanadium containing receptacle, and subjecting the iron and said receptacle to a melting heat.

Signed by me at Springfield, Mass., in presence of two subscribing witnesses.

FREDERICK W. STICKLE.

Witnesses:
　WM. S. BELLOWS,
　G. R. DRISCOLL.